H. F. BICKEL.
AIR BRAKE APPARATUS.
APPLICATION FILED APR. 23, 1914.

1,124,201.

Patented Jan. 5, 1915.
4 SHEETS—SHEET 1.

Witnesses:
Jas J. Maloney
M. L. Maloney

Inventor:
Henry F. Bickel
by H. F. Swerune
Atty

UNITED STATES PATENT OFFICE.

HENRY F. BICKEL, OF PLAINFIELD, NEW JERSEY, ASSIGNOR TO NEW YORK AIR BRAKE COMPANY, A CORPORATION OF NEW JERSEY.

AIR-BRAKE APPARATUS.

1,124,201.

Specification of Letters Patent.

Patented Jan. 5, 1915.

Application filed April 23, 1914. Serial No. 833,906.

*To all whom it may concern:*

Be it known that I, HENRY F. BICKEL, a citizen of the United States, residing in Plainfield, in the county of Union and State of New Jersey, have invented an Improvement in Air-Brake Apparatus, of which the following description, in connection with the accompanying drawings, is a specification, like numerals on the drawings representing like parts.

This invention relates to an air brake apparatus and is embodied in the car equipment of an automatic air brake apparatus of the kind now generally in use.

The object of the invention is to improve the action of the brakes especially in passenger train equipments and to increase the promptness of the action under the control of the engineer in the various conditions of operation.

The apparatus herein shown and described contains provision for prompt recharge of the auxiliary reservoirs so that a subsequent and effective application of the brakes may be made very promptly after the brakes have been released.

It also contains provision for quick serial action in service applications by locally reducing train pipe pressure on the car equipment in response to reduction in train pipe pressure made by the engineer.

It also embodies a novel construction and organization of the appliances which operate in emergency applications in which organization the local vent for reducing train pipe pressure is operated independently of the triple valve piston and vents to the atmosphere, and provision is made for augmenting the pressure in the brake cylinders that is obtainable from the auxiliary reservoirs in service applications. An emergency application with the augmented brake cylinder pressure can be produced at any time even when the brakes are already applied with any brake cylinder pressure up to the maximum obtainable in a service application.

Portions of the apparatus involved in the emergency operation are not herein claimed as they form the subject of another application, Serial Number 869,338, filed October 29, 1914.

Some of the advantages of the several improvements will be pointed out in connection with the description of the construction and operation of the apparatus embodying the improvements and represented in the accompanying drawings.

While the drawings represent the essential structural components and their operative relations to each other, they are somewhat in the nature of diagrams, being represented as if the various ports and passages were all in the plane of section instead of in different planes as they would be made in the commercial constructions for the sake of compactness and convenience of construction.

Figure 1:
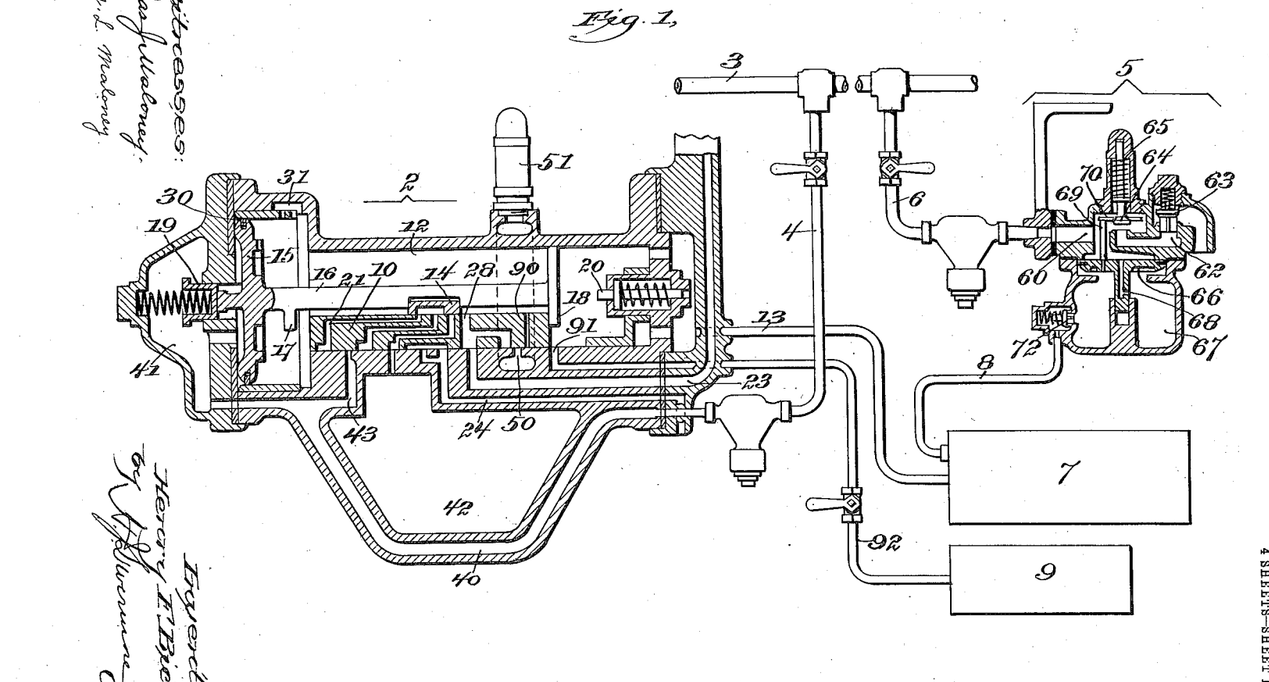
Figure 1 shows the components of the car equipment, except the brake cylinder and brake rigging, with the several component structures in section and with the parts in the position assumed in making an emergency application.

Referring to Fig. 1 the components included in the car equipment are the triple valve 2, in connection with the train pipe 3, by branch 4; and the emergency vent valve 5 connected with the train pipe 3 by branch 6 and also with the auxiliary reservoir 7 by a pipe or connection 8 that will be described, the equipment further including besides the auxiliary reservoir 7 a supplementary reservoir 9 connected by pipe 92 with the triple valve 2 and controlled as to its communication with other components by said triple valve as will be described. The supplementary reservoir 9 may be of smaller capacity than the auxiliary reservoir 7 and it is normally charged with the same pressure as that in the auxiliary reservoir when fully charged, said pressure being retained in the supplementary reservoir while service applications of the brakes are being made and being available for augmented brake cylinder pressure when an emergency application is made whether the brakes are already applied or not, and also being available for augmenting auxiliary reservoir pressure at the moment when the brakes are released and before the auxiliary reservoir has been fully recharged from the train pipe.

Figure 2:
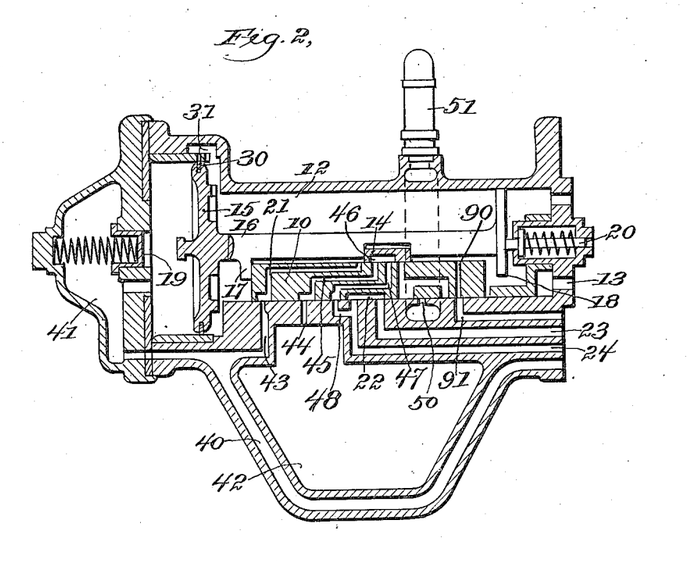
Fig. 2 is a sectional view of the triple valve with the parts in the position which will be called "normal release" which is also one of the positions in which the triple valve parts stand while the train is running with the brakes not applied.

Referring to Fig. 2, the main structural components of the triple valve include the main slide valve 10 working on a valve seat in the main chamber 12 of the triple valve body which is in constant free communication with the auxiliary reservoir 7 by the pipe or passage 13 as usual. The triple valve parts also include the supplementary valve 14 which operates on a seat on the main slide valve 10 and is connected with the triple valve piston 15 by the stem 16 thereof which has projections 17, 18 for engaging the main valve 10 and moving the same after a short independent movement of the piston and auxiliary valve 14 which shifts the latter relative to the main valve all as usual in this general class of apparatus. The triple valve piston 15 is acted upon at one side (the right hand side as shown in the drawings) by the auxiliary reservoir pressure in the chamber 12, and at the other side by train pipe pressure admitted from the train pipe branch 4 through the port 40 into the chamber 41 at the left hand side of the triple valve piston 15. A supplementary train pipe chamber or reservoir 42 is provided, herein shown as formed or contained in the main body of the triple valve, the purpose of which will be herein- after explained. A yielding stop 19 operates to arrest the movement of the triple valve piston and parts actuated thereby when acted upon by a preponderance of auxiliary reservoir pressure over train pipe pressure, said stop arresting the piston if the preponderance is comparatively small as in making service applications, but yielding to permit a further movement of the said piston to the position shown in Fig. 1 when the said preponderance is large as in the case of an emergency application of the brakes. A similar yielding stop 20 arrests the movement of the triple valve piston and the parts actuated thereby, when acted upon by a moderate preponderance of train pipe pressure over auxiliary reservoir pressure but yields to permit a further movement to the position shown in Fig. 6 when train pipe pressure has a greater preponderance over auxiliary reservoir pressure.

The operative relations of the various ports and communications controlled by the triple valve under the various conditions of operation may be best understood by reference to the several figures showing the different positions assumed in the varying conditions of operation. Normally when the train is running and the brakes are not applied the parts stand in the position shown in Fig. 2 or that shown in Fig. 7, the essential communications or port connections being the same in these two positions, which are the same except for a slight variation in the position of the main valve 10 the reason for which will be readily understood after the explanation of the various conditions of operation.

Referring to Fig. 2, the parts are in the position assumed when the triple valve piston has been moved by a moderate preponderance of train pipe pressure over auxiliary reservoir pressure and has been arrested by the yielding stop 20. Under these conditions the auxiliary valve 14 is at the extreme limit of its movement toward the right on its seat on the main valve 10 and said main valve 10 is engaged by the projection 17 of the triple valve piston stem 16 which has moved the main valve 10 to the position shown, on its seat in the triple valve body. In this position, a port 21 in the main valve 10 communicates with a passage 43 leading from the train pipe port 40 to the main valve seat and the said port 21 which leads to the seat of the auxiliary valve 14 is uncovered by said auxiliary valve so that communication is afforded from the train pipe through passages 43, 21, into the main chamber of the triple valve and thence through the passage 13 to the auxiliary reservoir which is thus recharged from the train pipe as long as the pressure in the latter remains in excess of that in the auxiliary reservoir. In this position of the main valve 10 the cavity 22 therein connects the brake cylinder port 23 with the exhaust port 24 as usual, so that the pressure is exhausted from the brake cylinder to release the brakes. A port 44 from the supplementary train pipe chamber 42 to the valve seat communicates with the port 45 in the main valve which is connected by the cavity 46 in the auxiliary valve 14 with the port 47 of the main valve which now communicates with the port 48 in the valve seat leading to the exhaust port 24 so that the chamber 42 is in communication with the atmosphere and any pressure which may have been contained therein is exhausted therefrom. When the triple valve piston 15 is arrested by the stop 20 as shown, the packing ring in the periphery of said piston closes the feed passage 30 (which under certain conditions as will be explained afterward, communicates from the train pipe to the auxiliary reservoir) and consequently in this position the only feed to the auxiliary and supplementary reservoirs is through the passages 43, 21 so that they recharge comparatively slowly although with sufficient rapidity for ordinary conditions of use.

As will be understood when the conditions for making service applications have been set forth, the pressure in the supplementary reservoir 9 was equal to normal train pipe pressure, and consequently greater than the pressure in the auxiliary reservoir 7 at the moment when the parts were moved from service to release position shown in Fig. 2 and consequently when the parts first come to the position shown in Fig. 2 pressure will flow through passages 92, 91 and port 90 in the main valve 10 from the supplementary reservoir 9 (see also Fig. 1) into the auxiliary reservoir 7 and increase the pressure in the latter more rapidly than would be the case if the sole replenishment were from the train pipe through the passages 43, 21.

In the position of the parts shown in Fig. 2 all other ports than those thus far described, are blanked or closed and consequently inactive and their functions and relations will be described in connection with the conditions of operation that call them into action. The application of the brakes is made in the usual manner by reducing train pipe pressure, and for a service application the train pipe pressure reduction is moderate in amount and as train pipe pressure falls the pressure from the auxiliary reservoir on the triple valve piston 15 preponderates and moves said piston toward the left. The first important effect takes place when the parts are moved to the position shown in Fig. 3 which movement takes place under a slight preponderance of auxiliary reservoir pressure, sufficient only to move the triple valve piston and to move the auxiliary valve on the main valve, such movement being momentarily checked or impeded when the projection 18 on the piston stem engages the main valve 10 and encounters its resistance to movement along its seat. The effect of this preliminary movement in response to train pipe pressure reduction is therefore to shift the auxiliary valve 14 on its seat on the main valve without shifting the position of the main valve on its seat. In this shifting the auxiliary valve 14 is moved from the position in which its cavity 46 connects the main valve ports 45 and 47 (as in Fig. 2) to the position in which said cavity closes or blanks the port 47 but connects the port 45 with the port 21 which latter is thus cut off from communication with the chamber 12 and with the auxiliary reservoir but is placed in communication with the supplementary train pipe chamber 42 so that air from the train pipe flows through passages 43, 21, 46, 45, and 44 into the supplementary train pipe chamber 42 which has a capacity properly proportioned to the train pipe capacity. The air from the train pipe thus expands into the chamber 42 with a reduction in pressure corresponding to the capacity of said chamber in proportion to the capacity of its share of the train pipe, that is, to the capacity of the train pipe length pertaining to the same car equipment. Such reduction of train pipe pressure accelerates the reduction that is taking place at the engineer's valve and thus increases the preponderance of auxiliary reservoir pressure on the triple valve piston of the same equipment. This acceleration of the train pipe pressure reduction also affects the equipments farther along in the train from the locomotive, so that their action is more prompt in response to the reduction made by the engineer, and by the consecutive similar actions in the several equipments the brakes are applied almost simultaneously throughout the length of the train. in a moderate service application, the same as is commonly done in an emergency application. Only a comparatively small reduction in train pipe pressure is required to effect this quick serial action of the brakes and the supplementary train pipe chamber 42 may be of such capacity as to reduce the train pipe pressure only the requisite amount to insure the complete movement of the triple valve to service position, so that as light an application of the brakes can be made as where they are controlled solely by the engineer's valve. The pressure in the supplementary train pipe chamber 42 may not fully equalize with that in the train pipe during the time in which the ports 48, 21, 46, 45, and 44 remain in communication, although obviously no more train pipe air can be vented into the chamber than enough to equalize the pressure in the latter with that in the train pipe. The capacity of the chamber thus fixes the maximum reduction of train pipe pressure that can be made by the action of the local vent. In practice, on a short train less air will be discharged into the supplementary train pipe chamber than on a longer train owing to the more prompt response of the main valve on a shorter train than on the longer train, and the consequent shorter period of communication through passages 43, 21, 46, 45, and 44. Thus the amount of local venting is greater on a longer than on a shorter train as is desirable because of the greater need for accelerating the action on the longer train. After the chambers 42 have been once charged, as takes place in the preliminary movement of the auxiliary valve 14 relative to the main valve, they have no further effect on train pipe pressure so that the brakes are under full control of the engineer as to the degree of force of application, the same as where no provision for quick serial action is made. The movement of the main valve 10 to the service position shown in Fig. 4 blanks the ports 43, 44 so that there is no further communication between the train pipe and train pipe chamber 42 after the main valve has been moved to service position in response to the reduction in train pipe pressure due to the venting at the engineer's valve and to the local venting into the chamber 42 which takes place in response to the movement of the auxiliary valve 14 relative to the main valve as has just been described.

Figure 3:
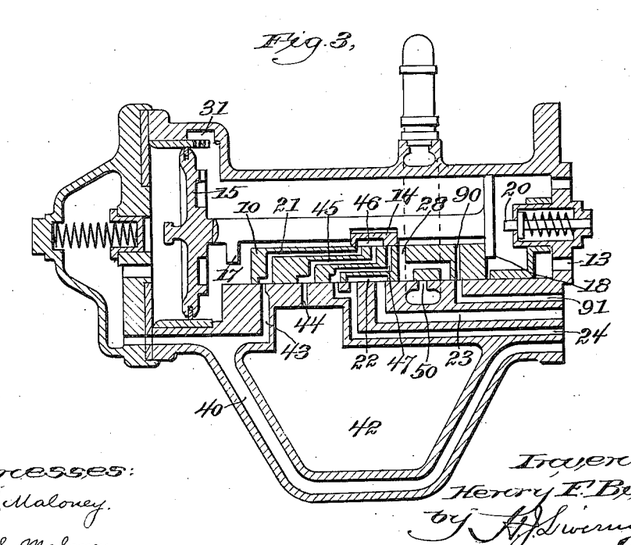
Fig. 3 is a similar section showing the parts in the position occupied in the initial movement for making a service application and in which a local reduction in train pipe pressure is made at said triple valve to accelerate the action of the brakes due to the reduction in train pipe pressure made at the engineer's valve for applying the brakes in the usual manner.
Figure 4:
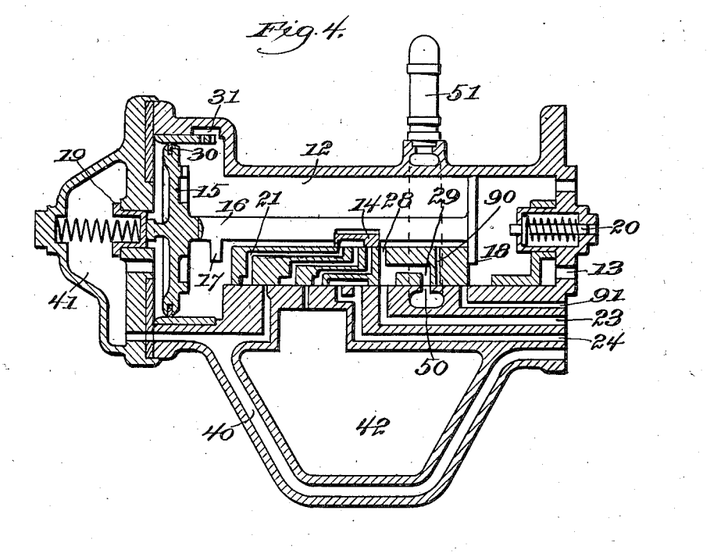
Fig. 4 is a similar section but showing the parts in the position occupied in making a service application while air is flowing from the auxiliary reservoir into the brake cylinder.

The sudden although comparatively slight drop in train pipe pressure due to the expansion or venting of train pipe air into the supplementary train pipe chamber 42, takes place by the time that the projection 18 on the stem of the triple valve piston engages the main valve 10 and consequently gives sufficient preponderance in auxiliary reservoir pressure to overcome the resistance of the main valve 10 so that it is promptly moved to the service position shown in Fig. 4, although insufficient, when the engineer's valve is either in service or in lap position to produce an emergency application. This movement of the main valve to service position is arrested by the yielding stop 19, as the preponderance of auxiliary reservoir pressure resulting from the local venting of the train pipe, although sufficient to move the main valve 10, is not sufficient to overcome the said stop 19, and the parts are therefore arrested in the position shown in Fig. 4. In this position the port 28 of the main valve which was uncovered by the auxiliary valve 14 in its initial movement as shown in Fig. 3 is brought into communication with the brake cylinder port 23 so that air flows freely from the auxiliary reservoir into the brake cylinder, this condition continuing until the auxiliary reservoir pressure falls slightly below train pipe pressure, the reduction of which is determined by the engineer according to the amount of braking force desired. When the auxiliary reservoir pressure falls slightly below train pipe pressure the latter preponderates and moves the triple valve piston toward the right, shifting the auxiliary valve 14 to the position shown in Fig. 5 where it closes the port 28 communicating with the brake cylinder and thus prevents further flow of air from the auxiliary reservoir to the brake cylinder until further reduction in train pipe pressure is made, when the auxiliary valve 14 will again be moved to the position shown in Fig. 4 and more air will be permitted to flow to the brake cylinder in the usual manner, the engineer controlling this action as usual, and being able to increase the brake cylinder pressure as is desired until the maximum pressure due to equalization of the pressure in the brake cylinder and auxiliary reservoir is obtained.

Figure 5:
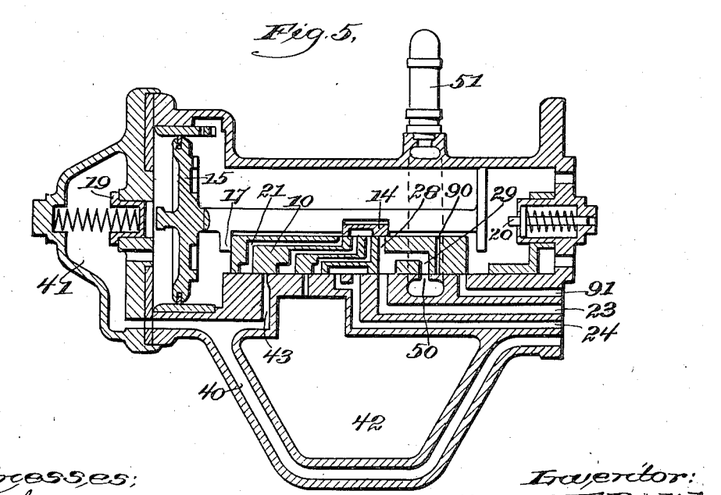
Fig. 5 is a similar view showing the parts in service lap position, assumed while the brakes are applied but with the flow from the auxiliary reservoir to the brake cylinder cut off to retain the pressure in the brake cylinder until further change in the braking force is desired.

The movement of the auxiliary valve from the open position shown in Fig. 4 to the closed or lap position shown in Fig. 5 is arrested by the projection 17 on the stem of the triple valve piston engaging the main valve 10 the resistance of which is sufficient to overcome the slight preponderance of train pipe pressure that was sufficient to move the auxiliary valve and thus to stop the flow of air from the auxiliary reservoir and prevent further increase of preponderance in train pipe pressure as usual in apparatus of this kind. When the main valve 10 is in the service position shown in Figs. 4 and 5 the port 90 is out of communication with the port 91 leading to the supplementary reservoir 9, said port 91 being closed by the main valve so that approximately the pressure which was in the supplementary reservoir before the service application of the brakes was made is retained therein during the service application of the brakes. It is to be observed, however, that when the apparatus is in running position as shown in Fig. 2 and a service application is to be made the pressure in both the auxiliary reservoir and the supplementary reservoir 9 acts in opposition to train pipe pressure so that there is comparatively small reduction in pressure due to back flow through the passages 21, 43, into the train pipe before the triple valve piston 15 is first operated to cut off said back flow entirely as shown in Fig. 3, but the volume of air from both of said reservoirs is available to initiate the movement of the main valve 10 from the running position shown in Figs. 2 and 3 to the service position shown in Fig. 4. The loss of pressure by back leakage during the interval in which the train pipe pressure is falling sufficiently to cause the triple valve piston and auxiliary valve to be moved, is so small that the pressure in the supplementary reservoir 9 remains almost equal to that in the train pipe at the time when the reduction began to be made, and the increased preponderance of the pressure from said reservoirs which results from the venting of the train pipe into the chamber 42 is sufficient to cause a prompt movement of the main valve 10 so that no further reduction of pressure in the supplementary reservoir takes place. In the service position of the main valve, furthermore, the port 29 connecting with the port 28 communicates with the port 50 in the valve seat leading to a safety or relief valve 51 which may be set to retain pressure up to a predetermined maximum and thereafter to open to prevent the pressure from rising materially above the said maximum, so that a higher pressure than the maximum for which the relief valve is set cannot be obtained in the brake cylinder in a service application of the brakes.

Figures 6, 7, 8:
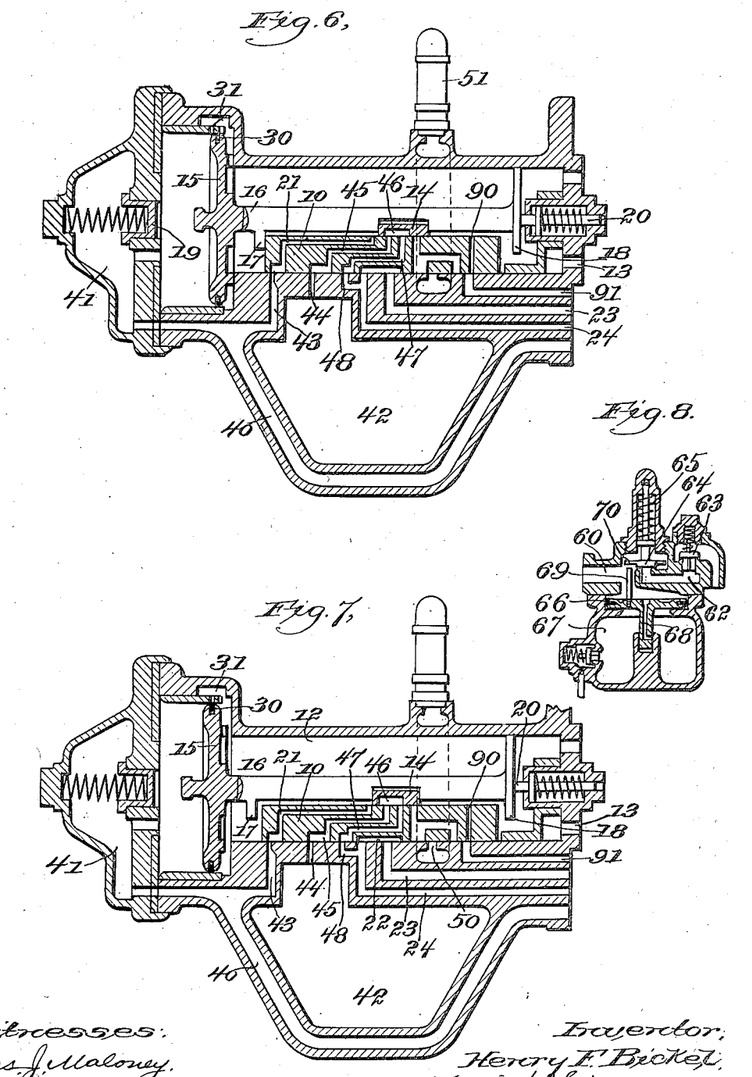
Fig. 6 is a similar view showing the parts in the release position as when operated to effect a more prompt recharge of the auxiliary reservoirs than takes place with the parts in the normal release position shown in Fig. 2.
Fig. 7 shows the position of the parts assumed after the auxiliary reservoirs have been recharged with the parts in the position shown in Fig. 6 this also being a normal running position in which the parts stand while the brakes are not applied, the various communications being the same as in the normal release position shown in Fig. 2.
Fig. 8 is a sectional view of the emergency train pipe vent valve in the position assumed at all times except when an emergency application is being made and the parts are moved to the position shown in Fig. 1.

With the herein described provision for locally venting the train pipe in service applications it is possible to make as light applications as can be made when such local venting is not provided for, or even lighter, because it is necessary for the engineer to reduce train pipe pressure only enough to insure the movement of the triple valve piston and auxiliary valve, the movement of which will result in the further reduction of train pipe pressure before the projection 18 engages the main valve, the reduction of train pipe pressure giving the auxiliary reservoir pressure sufficient preponderance to overcome the added resistance of the main valve with certainty. The reduction by local venting, which is determined by the capacity of the chamber 42, need be no greater than what is sufficient to overcome the resistance of the main valve, so that the total reduction in train pipe pressure need be no greater than that which the engineer has to make with the usual equipment in order to insure that the movement of the triple valve to service position will take place. In fact, the total reduction in train pipe pressure need not be quite so great, with the herein described local venting appliance, in order to insure equal certainty of movement of the main valve, because the sudden reduction due to venting takes place while the triple valve piston is still moving and before it encounters the additional resistance of the main valve by engagement of the projection 17 therewith and is therefore more effective to insure the movement of the main valve, than is the case when the piston is arrested by the main valve and waits until the slowly increasing preponderance in pressure becomes sufficient to overcome the resistance thereof, as is the case when the only reduction in train pipe pressure is that made by putting the engineer's valve in service position. After a service application the brakes are released in the usual manner by admitting pressure to the train pipe from the main reservoir under control of the engineer's valve and if the rise in train pipe pressure is large and sudden as is the case when the engineer admits the air directly from the main reservoir to the train pipe, or admits air when the pressure is low in the train pipe as after a comparatively strong or full service application of the brakes, the preponderance of train pipe pressure will force the triple valve piston to the right and will overcome the yielding stop 20 and force the triple valve piston against a seat at the end of the chamber 12 as shown in Fig. 6. In this position the auxiliary valve 14 is in the same position relative to the main valve 10 as in the normal release operation represented in Fig. 2 but the main valve 10 is moved a little farther to the right on its seat in the movement of the triple valve piston after it overcomes the stop 20. This movement of the main valve does not make any effective change in its relation to the ports in its seat controlled by it from that which exists in the normal release position shown in Fig. 2, as the port 21 still remains in communication with the port 43 so that air flows from the train pipe into the auxiliary reservoir, and the ports 45 and 47 still remain in communication with the ports 44 and 48 respectively so that air exhausts through said ports and the cavity 46 in the auxiliary valve from the supplementary train pipe chamber 42 to the atmosphere, and the port 90 is in communication with the port 91 leading to the supplementary reservoir 9 so that the pressures in the supplementary and auxiliary reservoirs equalize and both are recharged from the train pipe.

The only effective difference between the parts in the position shown in Fig. 6 and that shown in Fig. 2 is that in the position shown in Fig. 6 the ring 30 in the periphery of the triple valve piston 15 has passed the opening of the feed passage 31 so that air may also flow through said passage from the train pipe to the auxiliary reservoir which is thus very promptly charged by the combined flow through the said passage 31, and the passages 43, 21. As soon as the auxiliary and supplementary reservoirs are charged approximately to train pipe pressure the force of the yielding stop 20 moves the triple valve piston toward the left to the position shown in Fig. 2 and also in Fig. 7 but in this movement the projection 18 will not reach main valve 10 which will remain in the position shown in Fig. 6. The slight movement of the auxiliary valve 14 on the main valve from the position shown in Fig. 6 to that shown in Fig. 7 is not sufficient to make any effective change in the port connections, which are thus the same as in Fig. 2. The movement from the Fig. 6 to the Fig. 7 position will however, cause the ring 30 of the triple valve piston to close the feed passage 31 so that when the train pipe pressure is again reduced for another application of the brakes there will be no back flow from the auxiliary reservoir to the train pipe through said feed passage 31. In the release operation the auxiliary reservoir may thus be charged very promptly so that a second application of the brakes may be made with good effect almost immediately after the brakes have been released.

In order to make an emergency application of the brakes the train pipe pressure is suddenly reduced the same as with the apparatus now in general use, this reduction calling into action local train pipe vent valves which augment the reduction of train pipe pressure and hasten its action throughout the length of the train in a manner now well understood. In the apparatus now most generally used the train pipe vent valve for venting the train pipe in emergency applications is operated or controlled by the triple valve piston in its movement beyond the position at which it is arrested by a yielding stop the action of which relative to the triple valve piston is similar to that of the stop 19 of the construction herein shown. In the present construction, however, the train pipe vent valve for operating in emergency applications is structurally entirely independent of the triple valve piston, and as herein shown is included in a structurally separate appliance shown at 5 in Fig. 1 and shown in its normal or inactive position in Fig. 8. As shown in Fig. 8 the said emergency venting device contains a chamber 60 communicating with the train pipe through the passage 6 as shown in Fig. 1, said chamber 60 having an outlet 62 containing an outwardly opening check valve 63 and being controlled by a valve 64 normally held seated by the action of the spring 65 and by the train pipe pressure in the chamber 60. A piston 66 works in a short cylindrical chamber and is interposed between the train pipe chamber 60 and a pressure chamber 67 which is charged to train pipe pressure through a small feed passage 68 through or past the piston 66.

When the piston 66 is in normal position as shown in Fig. 8, the feed passage 68 is obstructed or partially closed by the guide socket for the piston stem as shown in Fig. 8 so that the flow of train pipe air into the pressure chamber 67 for charging the same is comparatively slow. In moderate reductions of train pipe pressure such as are made in service applications of the brakes, the pressure in the chamber 60 is correspondingly reduced leaving the pressure in the chamber 67 in preponderance and causing it to lift the piston 66. Such movement of the piston 66 will, however, be arrested when the pins 69 encounter the flange or projection 70 of the valve 64 and in this position the opening of the feed passage 68 through the piston 66 is withdrawn from the guide passage leaving said feed passage comparatively free so that pressure from the chamber 67 will flow back into the train pipe without producing sufficient preponderance of pressure on the piston 66 to unseat the valve 64. In case, however, of a sudden large drop in train pipe pressure such as is effected by the engineer to produce an emergency application of the brakes, the pressure in the chamber 67 will be left sufficiently in preponderance to cause the piston 66 to unseat the valve 64 as shown in Fig. 1 and thus permit train pipe air to escape through the passage 62 past the check valve 63, thus affording a large local vent from the train pipe and thereby hastening the action of the train pipe reduction on the other equipments as is well understood.

The spring acting on the check valve 63 may be set to retain a certain amount of pressure so that the train pipe need not be wholly depleted of air in making an emergency application. The effect of the sudden large drop in train pipe pressure, which thus takes place in an emergency application, on the triple valve is to cause the auxiliary reservoir pressure to preponderate sufficiently to overcome the yielding stop 19 and cause the triple valve piston to make its full traverse to the left as shown in Fig. 1. In the position of the main valve 10 thus produced the port 28 will still be in communication with the brake cylinder port 23 the same as in the position shown in Figs. 4 and 5, but the port 91 from the supplementary reservoir 9 will be uncovered and the port 50 leading to the relief valve 51 will be closed so that the pressure in the brake cylinder may be increased above the maximum obtainable in a service application.

It will be understood that the movement of the triple valve parts to the emergency position shown in Fig. 1 may take place at any time whether the triple valve is in normal or running position, or in the service application position shown in Figs. 4 and 5, with the effect that the relief passage 50 from the brake cylinder will be closed, and the brake cylinder pressure will be augmented by pressure from the supplementary reservoir 9. The venting of the train pipe through the valve 64 takes place very rapidly and the pressure in the chamber 67 falls rapidly and when approximately down to that in the train pipe the valve 64 is closed by the action of its spring 65. When air is again introduced into the train pipe to release the brakes it will force the piston 66 down and will cause the chamber 67 to be recharged through the feed passage 68 as has been before explained. To avoid charging the chamber 67 substantially above normal train pipe pressure as might perhaps take place by reason of the high pressure introduced to the train pipe in the release operation, the communication 8 to the auxiliary reservoir 7 through the check valve 72, permits air to pass from the chamber 67 into the auxiliary reservoir 7 in case the pressure in the former is higher than that in the latter and thus danger of overcharging the chamber 67 is avoided. Except for this provision a sufficient pressure might perhaps be introduced into the chamber 67 to operate the vent valve when the train pipe pressure falls to normal in the further charging of the auxiliary reservoir attendant upon the operation of releasing the brakes. The check valve 72, however, prevents pressure from the auxiliary reservoir 7 entering the chamber 67 to affect the operation or control of the vent valve 64.

It will be recognized that the supplementary reservoir 9 is inactive under all conditions described except in an emergency application, in which it augments the brake cylinder pressure, and in the release operation in which it initially hastens the recharging of the auxiliary reservoir; and except for the performance of these functions the said supplementary reservoir might be omitted while all the other functions of the apparatus would be retained. By having the emergency venting appliance controlled independently of the triple valve piston, the operation of the apparatus will not be impaired by a defective triple valve. On the other hand, if the emergency venting appliance should be defective it could be cut out of operation without affecting the action of the triple valve and the remainder of the equipment pertaining to the same car and without appreciably affecting the action of the brakes throughout the train even in an emergency application, as the vents in the remaining equipments would be sufficient to bring on the characteristic emergency application. Furthermore, a single emergency venting appliance may be used on each car equipment whether such equipment comprises only one triple valve and appurtenances or two such equipments are used on each car, as is sometimes the case with heavy passenger cars.

An equipment of the herein described construction will operate properly in connection with other equipments of the same construction or with any standard equipment of the constructions now generally in use. It sometimes happens that through some defect or lack of care a triple valve may stick and fail to move in the service operation until the train pipe pressure has fallen several pounds below the auxiliary reservoir pressure the preponderance of which will then be sufficient to move the triple valve piston throughout its entire stroke overcoming the yielding stop 19 when the main valve finally breaks away. When the local train pipe vent is controlled by the triple valve piston as is commonly the case in the apparatus heretofore used such movement of any one of the triple valve pistons would effect the opening of the corresponding local train pipe valve which would be likely to bring on an emergency application throughout the length of the train when only a moderate service application was intended. With the construction herein shown, however, it will be seen that such defective operation of one of the triple valves would produce no effect further than to momentarily place the auxiliary reservoir 7 and the supplementary reservoir 9 in communication with the brake cylinder but such communication would be cut off as soon as the pressure in said reservoirs had fallen to train pipe pressure, with the result that only a somewhat greater pressure would be produced in the brake cylinder of that equipment than on the other cars of the train. There is much less likelihood of such defective action of one of the vent valves 5 of the construction herein shown, as there are no slide valves to be moved by the piston 66 and there is but little likelihood of the pressure in the chamber 67 being greatly in excess of train pipe pressure except when the latter is dropped very suddenly and largely as by the movement of the engineer's valve to emergency position, or by the breaking apart of the train and the train pipe, which are the conditions that are to effect an emergency application of the brakes in accordance with the intended mode of operation of the apparatus.

What I claim is:

1. The combination of the train pipe, auxiliary reservoir; and triple valve of an air brake apparatus, with a supplementary train pipe chamber, and ports in the main and auxiliary valves of the triple valve whereby said chamber is placed in communication with the atmosphere in normal or running position of the triple valve, and whereby communication with the atmosphere is cut off and said chamber is placed in communication with the train pipe by the preliminary movement of the auxiliary valve relative to the main valve in making a service application of the brakes.

2. The combination of the train pipe, auxiliary reservoir, and triple valve of an air brake apparatus, with a yielding stop for the triple valve piston engaged in its movement produced by preponderance of train pipe pressure over auxiliary reservoir pressure; and a feed passage past the periphery of the triple valve piston located to be closed by the piston when arrested by said yielding stop and to be opened thereby when the piston is moved against the resistance of said yielding stop, and a communication from the train pipe to the auxiliary reservoir controlled by the main valve of the triple valve and being open in the position of said main valve assumed when the piston is arrested by the yielding stop and also when the piston has been moved to overcome the yielding stop.

In testimony whereof, I have signed my name to this specification in the presence of two subscribing witnesses.

HENRY F. BICKEL.

Witnesses:
JAS. A. HICKS,
M. WOMACK.